Figure 1:
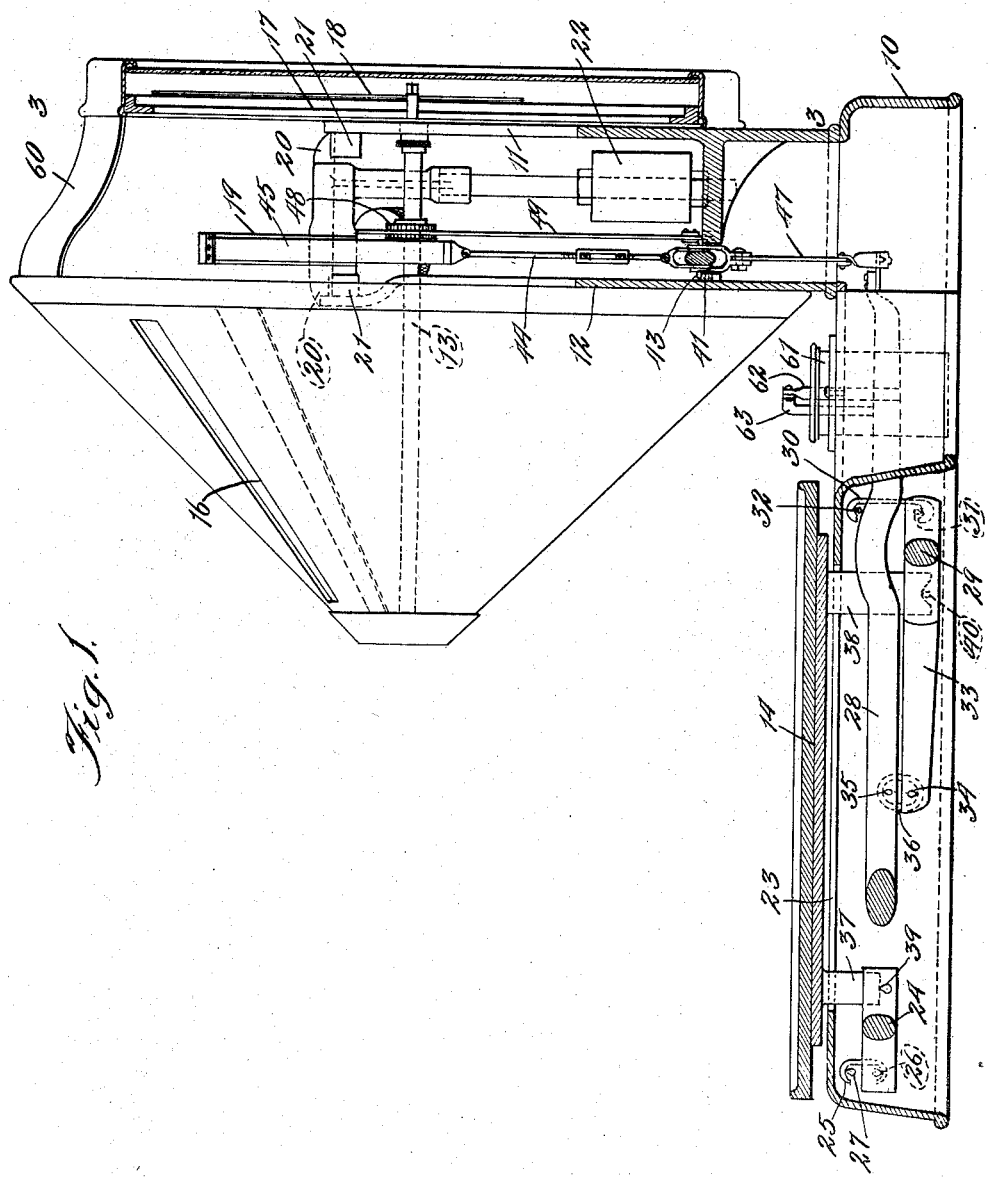

J. E. COCHRAN.
WEIGHING SCALE.
APPLICATION FILED JULY 5, 1907.

1,109,043.

Patented Sept. 1, 1914.

3 SHEETS—SHEET 1.

Witnesses:
Inventor:
J. E. Cochran,
by Brown & Hopkins
Attys

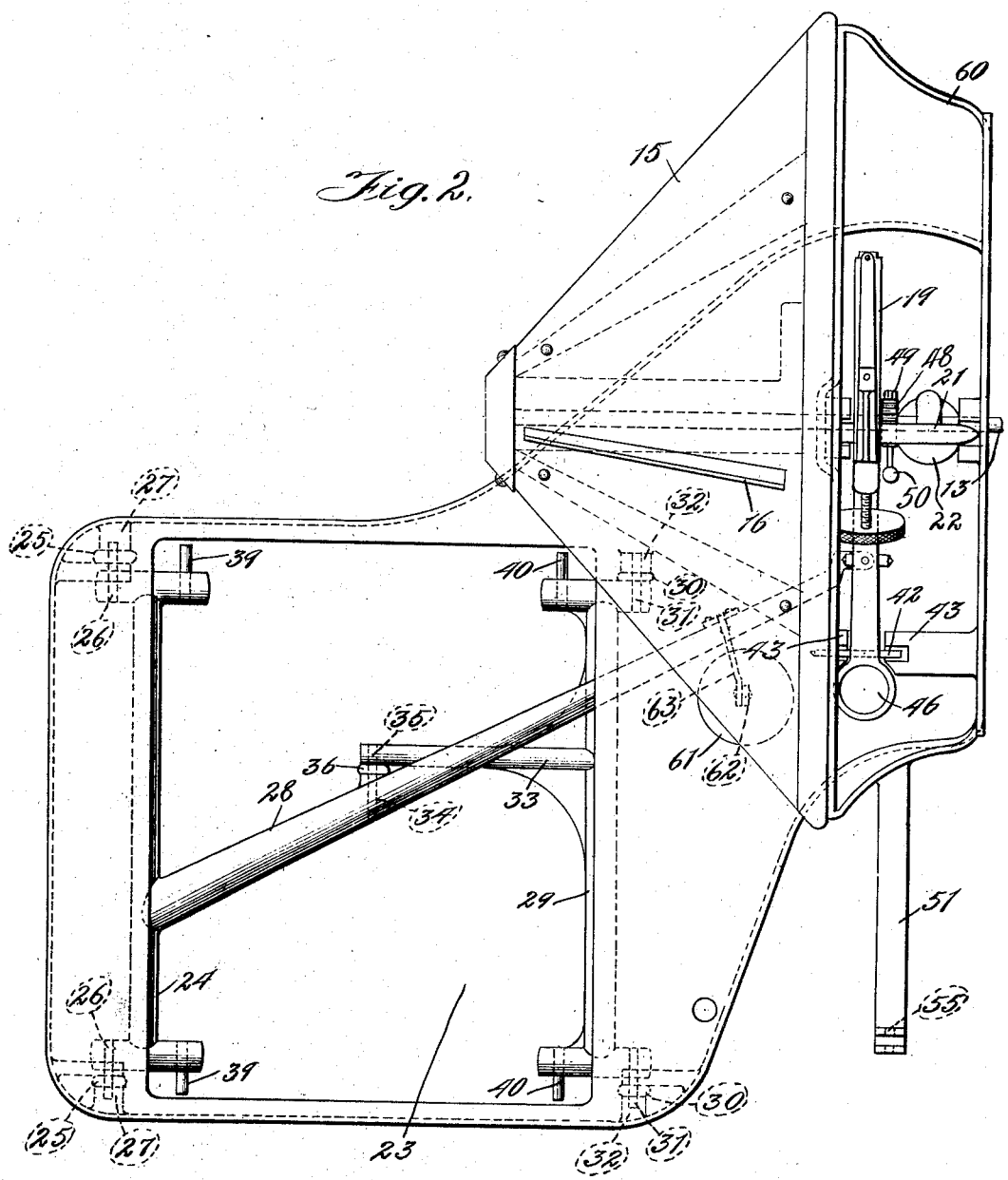

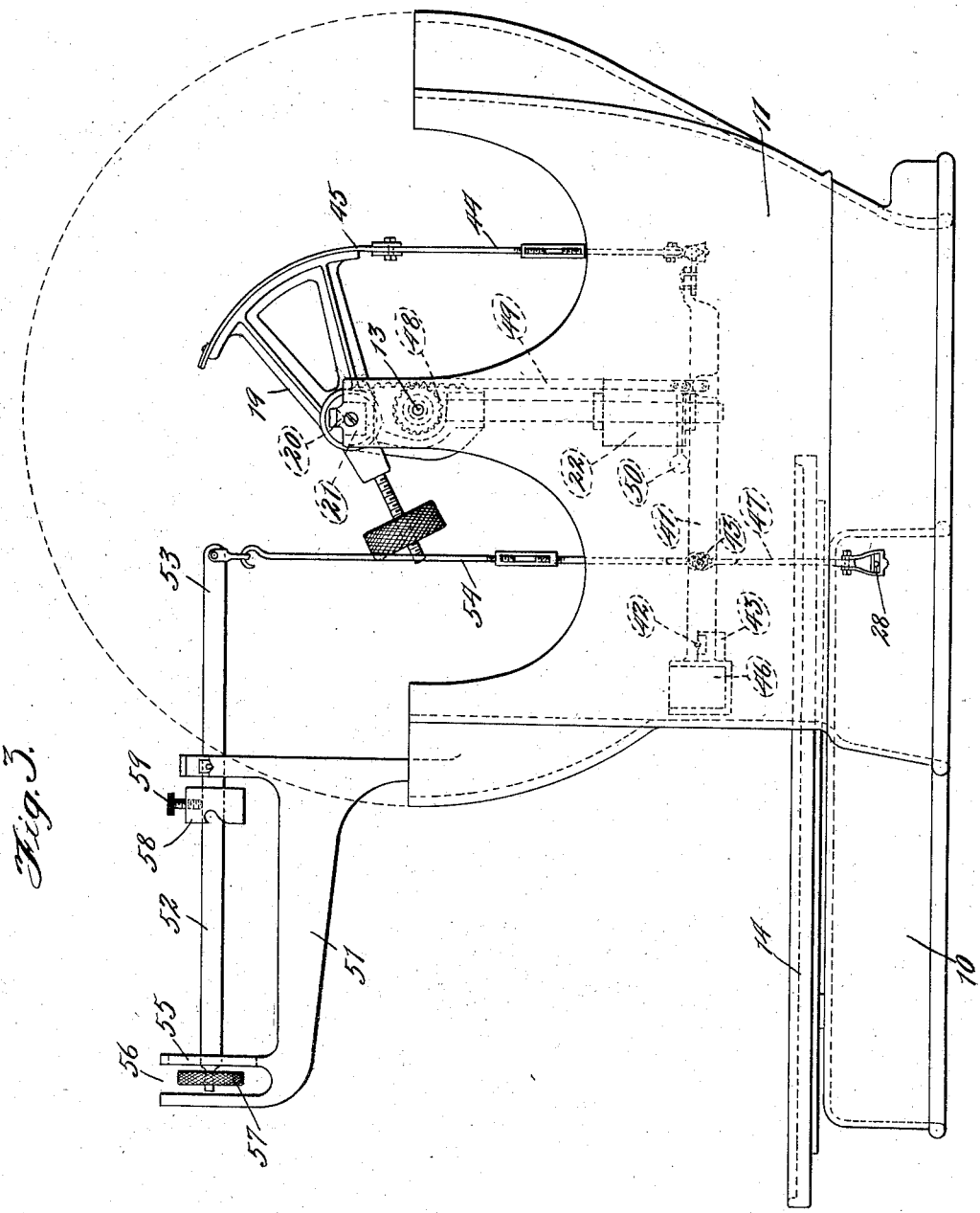

UNITED STATES PATENT OFFICE.

JOSEPH E. COCHRAN, OF ELKHART, INDIANA.

WEIGHING-SCALES.

1,109,043.  Specification of Letters Patent. Patented Sept. 1, 1914.

Application filed July 5, 1907. Serial No. 382,241.

*To all whom it may concern:*

Be it known that I, JOSEPH E. COCHRAN, a citizen of the United States, residing at Elkhart, in the county of Elkhart and State of Indiana, have invented certain new and useful Improvements in Weighing-Scales, of which the following is a specification.

This invention relates to improvements in weighing scales and more particularly to that type known as platform scales and in which is employed a horizontally disposed conical dial, and the primary object of the invention is to construct an improved compact scale of this character in which the platform will be close to the dial.

A further object is to construct an improved scale of this character in which the dial will be arranged in close proximity to the platform and in such a position with relation thereto that the dial will not interfere with the objects to be weighed and the objects will not obstruct the dial, and at the same time produce a compact scale requiring but a comparatively small space on the counter or support.

A further object is to provide an improved scale of this character in which the parts are so arranged that the user will be close to the dial.

A further object is to construct an improved scale of this character in which the platform will be supported at a low elevation and at the same time provide an improved scale having a large capacity.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an exemplification of the invention and in which—

Figure 1 is a longitudinal sectional view, partly in elevation, of an improved scale of this character constructed in accordance with the principles of this invention. Fig. 2 is a top plan view of Fig. 1 with the platform or support and the vertical dial removed. Fig. 3 is an end elevation taken on line 3—3 of Fig. 1.

Referring more particularly to the drawings and in this exemplification of the invention, the numeral 10 designates a supporting base and projecting above the face of the base and preferably at one end thereof are spaced uprights or standards 11, 12. Journaled in suitable bearings in these uprights or standards is a shaft 13, the extremities of which preferably project beyond the respective uprights or standards and secured to one extremity of the shaft 13 to rotate therewith is a horizontally disposed conical dial, the base of which is disposed adjacent the upright or standard 12 and the apex thereof is disposed toward the platform or support 14. This dial is preferably inclosed within a casing or housing 15, which is provided with a suitable slot 16, through which the numbers on the dial may be exposed to the user. The other extremity of the shaft 13 projects through a vertically arranged dial 17, and secured to the extremity of the shaft is a suitable indicator or pointer 18, which rotates with the shaft 13 and moves over the face of the dial 17 in a plane parallel with the plane of the dial.

Arranged between the uprights or standards 11, 12, is a weighted segment 19 which is pivotally mounted by means of suitable knife edges 20 engaging and resting in suitable bearings 21 respectively on the uprights or standards 11, 12. A suitable counterbalancing weight 22 is also arranged between the uprights or standards 11, 12, and is operatively connected with the knife edges 20 for counterbalancing the weighted segment 19.

The base 10 is provided with an aperture or opening 23, which is located adjacent the conical dial and preferably disposed to one side thereof and arranged adjacent one side of the opening 23, and within the base is a lever 24 which is supported by suitable links 25 engaging suitable knife edges 26 at the extremities of said lever, and the free ends of the links are adapted to engage suitable knife edges 27 secured to the base 10. The lever 24 is provided with an arm or beam 28, which extends across the opening 23 and within the base 10, the free end of which terminates adjacent the supports or standards 11, 12. A similar lever 29 is pivotally supported adjacent the other side of the opening 23 and parallel with the lever 24 by means of suitable links 30, one extremity of which engages suitable knife edges 31 on the lever 29 and the free extremities thereof engage suitable knife edge bearings 32 on the base and said links serve as a means for supporting one end of the lever 29.

Projecting laterally from the lever 29 is an arm or extension 33, which extends to a point adjacent the center of the opening 23 and is provided with a knife edge bearing 34 adjacent the free extremity thereof. A similar knife edge bearing 35 is arranged on the arm 28 of the lever 24 and a suitable link 36 is arranged to engage the knife edges 34 and 35 for pivotally connecting the arms 28 and 33 to form a compound lever. The platform or support 14 is provided with depending projections 37, 38, the free extremities of which are provided with suitable bearings adapted to engage knife edges 39, 40 respectively on the arms 28 and 33, so that when a weight is placed upon the platform or support 14, the levers 24 and 29 will be rocked about their points of pivotal support to rock the arms 28 and 33.

Arranged between the uprights or standards 11 and 12 and preferably disposed in a direction transverse to the arm 28 is a beam or lever 41, which is supported by knife edges 42 engaging and resting in suitable bearings 43 supported by the uprights or standards 11, 12. This beam or lever 41 is preferably arranged transversely to the shaft 13 and is located at some distance below the weighted segment 19 and is connected to the segment preferably by means of an adjustable member 44 having a flexible section 45 so that when the end of the beam or lever 41 is depressed, the member 44, together with the flexible section 45 will rock the segment 19 about its point of pivotal support. If desired, the beam or lever 41 may be provided with a receptacle 46 on the free end thereof adjacent its point of pivotal support, which is adapted to receive a heavy object, such as shot or the like, for counterbalancing the lever when desired. A suitable member 47 is pivotally connected by one end to the beam or lever 41 and is pivotally connected by its other end to the extremity of the arm 28 and forms the operative connection between the platform or support 14 and the beam or lever 41. A suitable pinion wheel 48 is secured to the shaft 13 preferably intermediate the uprights or standards 11 and 12, and pivotally connected to the beam or lever 41 is a rack bar 49 which is adapted to engage the pinion wheel 48 so that when the beam or lever 41 is moved about its point of pivotal support, the rack 49 will rotate the shaft 13 through the medium of the pinion wheel 48 and thereby rotate the conical dial within the casing 15 and the indicator or pointer 18. The rack bar 49 may be held in engagement with the pinion wheel 48 in any desired or suitable manner, preferably by means of a weighted arm 50.

Secured to any suitable support, preferably the uprights or standards 11, 12, is an arm or bracket 51, and pivotally supported thereby and intermediate the ends thereof is a tare beam 52. One extremity 53 of this beam preferably projects between the dials and is connected to the beam 41 in any desired or suitable manner, preferably by means of an adjustable member 54, one end of which is pivotally connected to the extremity 53 of the beam 52, and the other end is pivotally connected to the beam or lever 41 adjacent the point of pivotal connection of the extremity of the member 47 therewith. The other extremity of the tare beam 52 extends through a suitable aperture 55 in one wall of a bifurcated portion 56 of the bracket 51, which is located some distance beyond the point of pivotal support of the beam. Located within the bifurcation 56 and adjustably mounted on the end of the beam 52 is a suitable counter-balancing weight or member 57, and slidably mounted upon the tare beam 52 is a pea 58 which may be held in its adjusted position in any desired or suitable manner, preferably by means of a screw 59.

If desired, a suitable casing or covering 60, such as sheet metal or the like, may be arranged to close the space between the dials for the purpose of protecting the parts of the scale, this covering being provided with a suitable aperture through which the extremity 53 of the beam 52 may pass.

If desired and in order to take up the "back lash" or to relieve the parts of any sudden jar due to the placing of a weight upon the platform or support 14 or the removal thereof, a suitable dash pot 61 may be provided. This dash pot may be located in any convenient place, preferably at a point below the conical dial and adjacent the free end of the arm 28. This dash pot is preferably provided with a plunger rod 62, the free extremity of which is secured to the arm 28 by means of a suitable connection 63.

With this improved construction of scale it will be noted that the dial is arranged in close proximity to the support or platform 14 and in such a position that it not only allows the user to stand close to the dial for reading the same but the dial is so located with relation to the platform that it will not be in a position to interfere with any object which may be placed upon the platform or support and at the same time the object will not obstruct the dial. Furthermore, it will be noted that with this improved construction of scale, the compound lever construction permits the platform to be supported at a very low elevation, thereby obviating the necessity of lifting a heavy object a very great height to place it upon the platform or support.

In order that the invention might be fully understood by those skilled in the art, the details of the foregoing embodiment thereof have been thus specifically described, but

What I claim as new and desire to secure by Letters Patent is—

In a scale of the class described, the combination of a horizontal load platform, an upstanding support offset rearwardly and laterally with respect to said platform, a rotary conical dial mounted on said support above said platform with its axis horizontally disposed, and having its inclined surface above the nearest boundary substantially of said platform, and means actuated by said platform for rotating said dial.

In testimony whereof I have signed my name to this specification, in the presence of two subscribing witnesses, on this first day of July A. D. 1907.

JOSEPH E. COCHRAN.

Witnesses:
LOUISE ROSWELL,
W. R. SCUDDER.